United States Patent
Han

(10) Patent No.: US 9,313,387 B2
(45) Date of Patent: Apr. 12, 2016

(54) CAMERA MODULE WITH ACTUATOR MOUNTING STRUCTURE

(71) Applicant: LG INNOTEK CO., LTD., Seoul (KR)

(72) Inventor: Kwang Joon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/363,126

(22) PCT Filed: Mar. 4, 2013

(86) PCT No.: PCT/KR2013/001715
§ 371 (c)(1),
(2) Date: Jun. 5, 2014

(87) PCT Pub. No.: WO2013/133584
PCT Pub. Date: Sep. 12, 2013

(65) Prior Publication Data
US 2014/0362243 A1    Dec. 11, 2014

(30) Foreign Application Priority Data
Mar. 5, 2012    (KR) .......................... 10-2012-0022190

(51) Int. Cl.
| H04N 5/228 | (2006.01) |
| H04N 5/225 | (2006.01) |
| G03B 3/10 | (2006.01) |
| G03B 5/00 | (2006.01) |
| G03B 13/36 | (2006.01) |
| H04N 5/232 | (2006.01) |

(52) U.S. Cl.
CPC ................ *H04N 5/2254* (2013.01); *G03B 3/10* (2013.01); *G03B 5/00* (2013.01); *G03B 13/36* (2013.01); *H04N 5/23287* (2013.01); *G03B 2205/0007* (2013.01)

(58) Field of Classification Search
CPC ........................ H04N 5/2254; H04N 5/23287
USPC ....................................................... 348/208.12
See application file for complete search history.

(56) References Cited

U.S. PATENT DOCUMENTS

| 2008/0253003 A1* | 10/2008 | Shin et al. ..................... 359/824 |
| 2009/0122159 A1* | 5/2009 | Sakaue et al. ............ 348/231.99 |
| 2009/0154833 A1* | 6/2009 | Sakaue et al. ................. 382/282 |
| 2010/0005348 A1* | 1/2010 | Tomikura et al. ............... 714/57 |

(Continued)

FOREIGN PATENT DOCUMENTS

| KR | 10-2010-0008529 A | 1/2010 |
| KR | 10-0951300 B1 | 4/2010 |

(Continued)

OTHER PUBLICATIONS

International Search Report in International Application No. PCT/KR2013/001715, filed Mar. 4, 2013.

*Primary Examiner* — Usman Khan
(74) *Attorney, Agent, or Firm* — Saliwanchik, Lloyd & Eisenschenk

(57) ABSTRACT

The camera module according to exemplary embodiments of the present invention includes a PCB (Printed Circuit Board) mounted with an image sensor, a housing mounted therein with camera constituent parts and configured to protect the image sensor, an actuator arranged on the housing, and an electronic circuit pattern layer integrally formed on a surface of the housing to conductively connect the actuator to the PCB.

16 Claims, 2 Drawing Sheets

(56) References Cited

U.S. PATENT DOCUMENTS

2011/0134303 A1* 6/2011 Jung et al. .................. 348/340
2011/0150442 A1* 6/2011 Ollila et al. .................. 396/55

FOREIGN PATENT DOCUMENTS

| KR | 10-0966967 B1 | 6/2010 |
| WO | WO-2010-043078 A1 | 4/2010 |

* cited by examiner

CAMERA MODULE WITH ACTUATOR MOUNTING STRUCTURE

CROSS-REFERENCE TO RELATED APPLICATIONS

This application is the U.S. national stage application of International Patent Application No. PCT/KR2013/001715, filed Mar. 4, 2013, which claims priority to Korean Application No. 10-2012-0022190, filed Mar. 5, 2012, the disclosures of each of which are incorporated herein by reference in their entirety.

TECHNICAL FIELD The teachings in accordance with exemplary embodiments of this invention relate generally to a camera module.

BACKGROUND ART

Such techniques as VCM (Voice Coil Motor) used to be applied to conventional camera modules can hardly be applied to a miniaturized and low power consuming camera module such that researches thereon have been briskly waged.

Recently, a camera module has been developed that performs an auto-focusing operation using an actuator, whereby values of miniaturization, low power consumption and high performance have been proved. The actuator can be controlled by conductively connecting both electrodes of AF (auto focus) terminal to a PCB AF (Printed Circuit Board AF) pad.

At this time, when a user attempts to capture an image, a focus of the camera module is blurred by shocks such as vibration of the user's hands, and therefore a reduction in the quality of a captured image may occur. That is, in a case there is vibration in a user's hands which hold the camera module, the subject image moves to a different location and therefore the focus of the camera vibrates, so that the phenomenon of blurring of the subject image may occur.

A hand-shake correction mechanism is a device applied to preventing a reduction in the quality of a captured image caused by hand-shake during photographing. A conventional hand-shake correction mechanism was mainly used for a digital camera. This is because a large-sized camera module is easier in application of the hand-shake correction mechanism than a compact-sized camera module used for mobile phones.

However, concomitant with demands requiring a high quality image in a compact-sized camera module as that of a digital camera, a hand-shake correction mechanism has been applied to mobile compact-sized camera module, and as a result, attempts at developing and researching the hand-shake correction mechanism have been actively made.

DISCLOSURE OF INVENTION

Technical Problem

Accordingly, the present invention has been made keeping in mind the above problems occurring in the prior art, and an object of the present invention is to implement a camera module with a structurally improved actuator capable of performing at least one of auto focusing function and hand-shake correction function.

Solution to Problem

In order to accomplish the above objects, an exemplary embodiment of the present invention, in one general aspect, provides a camera module, the camera module comprising: a PCB (Printed Circuit Board) mounted with an image sensor; a housing mounted therein with camera constituent parts and configured to protect the image sensor; an actuator arranged on the housing; and an electronic circuit pattern layer integrally formed on a surface of the housing to conductively connect the actuator to the PCB.

Furthermore, the actuator may be equipped with at least one of auto focusing function and hand-shake correction function.

According to a first exemplary embodiment of the present invention, the actuator may perform a hand-shake correction function.

According to a second exemplary embodiment of the present invention, the actuator may include an auto focusing layer arranged at a position proximate to the housing, and an OIS (Optical Image Stabilization) layer stacked at an upper surface of the auto focusing layer to perform the hand-shake correction function.

According to a third exemplary embodiment of the present invention, the actuator may include an OIS (Optical Image Stabilization) layer arranged at a position proximate to the housing, and an auto focusing layer stacked at an upper surface of the OIS (Optical Image Stabilization) layer.

Meanwhile, according to the second and third exemplary embodiments of the present invention, each of the OIS layer and the auto focusing layer may be formed by an individual module, may drive one sheet of lens, and may preferably perform the hand-shake correction and auto focusing functions.

According to a fourth exemplary embodiment of the present invention, the OIS layer and the auto focusing layer may be integrally formed in one body to controllably lift, shift and tilt one sheet of lens.

urthermore, the PCB may be formed with a first terminal unit, the OIS layer may be formed with a second terminal unit and the auto focusing layer may be formed with a third terminal unit, wherein the first, second and third terminal units are connected to the electronic circuit pattern layer.

Furthermore, the housing may include a holder protecting the image sensor, and a lens barrel mounted with at least one or more sheets of lenses.

Furthermore, the PCB and the electronic circuit pattern layer may be conductively connected to a connection unit formed with at least one of soldering and Ag dot bond.

Advantageous Effects of Invention

A camera module according to the present invention has an advantageous effect in that an actuator can be directly mounted on a wiring integrally formed with a surface of a camera module body without a connection member such as a conventional C-FPCB (Contact Flexible PCB), whereby it is easy to assemble the camera module.

Another advantageous effect is that, in a case an actuator is configured to have at least one of hand-shake correction and auto focusing functions, it is possible to form a wiring for individual functional control on a surface of a camera module body, whereby a complicated connection structure can be dispensed with.

BEST MODE FOR CARRYING OUT THE INVENTION

Now, the camera module according to exemplary embodiments of the present invention will be described in detail with reference to the accompanying drawings.

Figure 1:
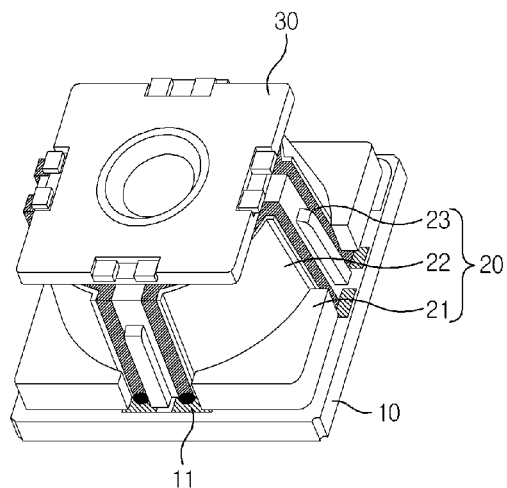
FIG. 1 is a perspective view illustrating a camera module according to an exemplary embodiment of the present invention.
Figure 2:
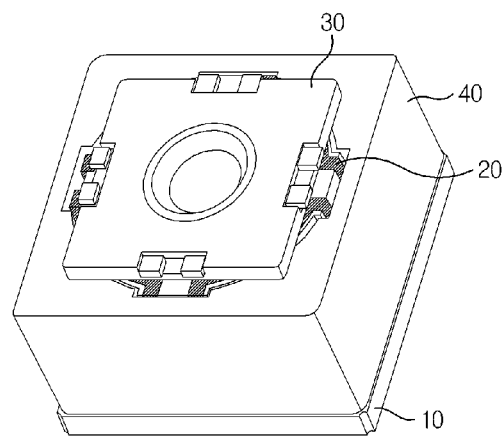
FIG. 2 is a perspective view illustrating a camera module of FIG. 1 removed of a shield can according to an exemplary embodiment of the present invention.
Figure 3:
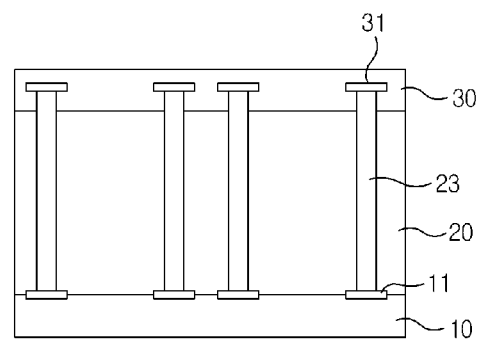
FIG. 3 is a schematic view illustrating a wiring method of an actuator having only a hand-shake correction function according to a first exemplary embodiment of the present invention.
Figure 4:
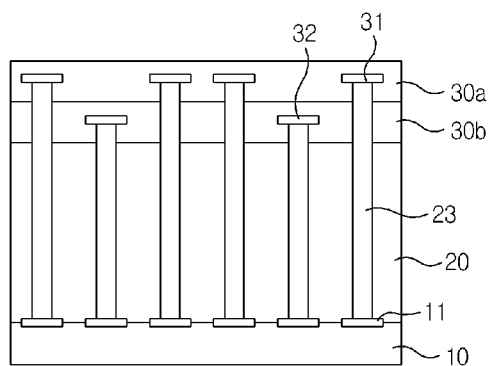
FIGS. 4 and 5 are schematic views illustrating a wiring method of an actuator having a hand-shake correction function layer and an auto focusing function layer according to second and third exemplary embodiments of the present invention.
Figure 5:
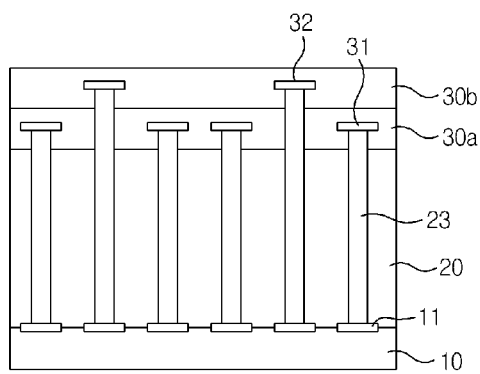
Figure 6:
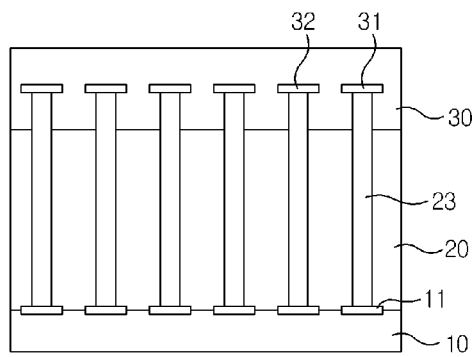
FIG. 6 is a schematic view illustrating a wiring method of an actuator having hand-shake correction and auto focusing functions embodied in one module according to a fourth exemplary embodiment of the present invention.

FIG. 1 is a perspective view illustrating a camera module according to an exemplary embodiment of the present invention, FIG. 2 is a perspective view illustrating a camera module of FIG. 1 removed of a shield can according to an exemplary embodiment of the present invention, FIG. 3 is a schematic view illustrating a wiring method of an actuator having only a hand-shake correction function according to a first exemplary embodiment of the present invention, FIGS. 4 and 5 are schematic views illustrating a wiring method of an actuator having a hand-shake correction function layer and an auto focusing function layer according to second and third exemplary embodiments of the present invention, and FIG. 6 is a schematic view illustrating a wiring method of an actuator having hand-shake correction and auto focusing functions embodied in one module according to a fourth exemplary embodiment of the present invention.

Referring to FIGS. 1 to 6, a camera module according to an exemplary embodiment of the present invention may include a PCB (Printed Circuit Board, 10), a housing (20) mounted at an upper surface of the PCB (10), an actuator (30) arranged at an upper surface of the housing (20); and a shield can (40) coupled to an outside of the housing (20).

The PCB (10) may be provided with a plurality of first terminal units (11), and the first terminal units (11) are signal-transferrably connected to the actuator (30), and the PCB (10) is preferably mounted with an image sensor (not shown). At this time, the first terminal units (11) may be conductively connected to an electronic circuit pattern layer (23) formed on a surface of the housing (20) through a connection unit (12), where the connection unit (12) may be formed with at least one of soldering and Ag dot bond.

The housing (20) may include a holder (21), a barrel (22) and an electronic circuit pattern layer (23). The housing (20) may be integrally formed with the holder (21), the barrel (22) and the electronic circuit pattern layer (23), and the housing (20) includes therein with a lens.

The holder (21) is preferably formed with a predetermined height (h) to accommodate the image sensor therein as shown in FIG. 2, and may be provided in an approximately square shape. The barrel (22) may be provided with an approximately cylindrical shape, and mounted therein with at least one or more lenses (not shown). In an exemplary embodiment of the present invention, the electronic circuit pattern layer (23) may be formed to have a wiring pattern on surfaces of the holder (21) and the barrel (22). The electronic circuit pattern layer (23) may be formed using three methods.

To begin with a first method is a patterning method through over-molding which is a process that is used in manufacturing forms to create parts and improve product efficiency. That is, the over-molding or two-shot molding is an injection molding process using two separate molds of which one material is molded over another material. In this case, a part forming the holder (21) and the barrel (22) is used with one material and a part forming the electronic circuit pattern layer (23) is used with another material, where two parts are injection-molded. In this case, the holder (21) and the barrel (22) are molded with an insulating material while the electronic circuit pattern layer (23) is molded using a conductive synthetic resin. Alternatively, a part to be formed with the electronic circuit pattern layer (23) is molded using synthetic resin capable of being easily metal-plated, the holder (21) and the barrel (22) are injection-molded, to finish the electronic circuit pattern layer (23) using a post-processing such as a plating process.

A second method is such that, while the holder (21) and the barrel (22) forming the housing (20) are made to contain impurities reacting to light and heat, the housing (20) is injection-molded, the injection-molded housing (20) is formed with a wiring pattern where the electronic circuit pattern layer (23) is to be formed, using surface patterning work such as laser exposure. In a case the electronic circuit pattern layer (23) is formed using the abovementioned method, an SMD (Surface-Mount Device) or accessory electronic parts can be directly mounted because the electronic circuit pattern layer (23) itself has a conductible property.

A third method is such that a front is metalized, a non-circuit part is etched for patterning. To be more specific, an entire surface of the holder (21) and the barrel (22) forming the housing (20) is metalized, where only a part forming the electronic circuit pattern layer (23) is left untouched, and balance is etched to integrally form the electronic circuit pattern layer (23) on the surface of the housing (20).

Meantime, the electronic circuit pattern layer (23) provided using the above-mentioned technologies may be formed on one side of the surface of the housing (20), if necessary, and may be formed on an exposed surface at the outside and a non-exposure surface at the inside, whereby arrangement of the electronic circuit pattern layer (23) may be selectively formed on a cross-section or both sides depending on necessity of wiring for components or parts mounting.

Thus, in a case there is a need of mounting many electronic parts, the electronic circuit pattern layer (23) can be formed on a surface of the housing (20) as well as on a rear surface using the abovementioned method, to which the parts can be mounted. In a case the electronic circuit pattern layer (23) is mounted on the surface of the housing (20) as mentioned above, a mounting space for parts can be advantageously reduced when miniaturized electronic parts are assembled.

Although not illustrated, it is possible to directly and integrally form an electronic circuit on a body injection-molded in an electronic product using a separate PCB, in addition to the camera module having the actuator thus explained in the exemplary embodiments. In this case, it is possible to directly couple or arrange the SMD or electronic parts on a circuit pattern formed on the injection-molded body. In a case the electronic parts are arranged as mentioned above, it is possible to remove the cumbersomeness of coupling the PCB to the parts body and to connect the wiring because there is no need of manufacturing a separate PCB or coupling process, whereby the manufacturing cost can be reduced through the reduced number of parts.

The actuator (30) may be directly and conductively connected at an upper surface of the housing (20) to the electronic circuit pattern layer (23) without a connection member such as the C-FPCB. The conductive connection methods may include any conductive connection methods including soldering, fixation using an ultrasonic fusion and conductive resin and fixation using gold beads.

The actuator (30) may be provided in various shapes including a micro actuator, a silicone actuator, and a voice coil motor, and may be applicable to various methods including an electrostatic method, a thermal method, a bimorph method and an electrostatic force method.

FIG. 3 is a schematic view illustrating the actuator (30) configured as an OIS for hand-shake correction function according to a first exemplary embodiment of the present invention.

Referring to FIG. 3, the actuator (30) includes a plurality of second terminal units (31) on a same layer, where the second terminal units (31) may be conductively connected by the first terminal units (11) formed on the PCB (10) and the electronic circuit pattern layer (23).

Meanwhile, as illustrated in FIGS. 4 and 5, the actuator (30) may be configured with individual modules for respectively performing the auto focusing function and the hand-shake correction function. To this end, as illustrated, the actuator (30) is formed with an auto focusing layer (30b) controllably driving one sheet of lens (not shown) and a hand-shake correction layer (30a) controllably driving one sheet of lens (not shown), and the layers (30a, 30b) may be sequentially stacked to form the actuator (30).

As illustrated in FIG. 4, according to the second exemplary embodiment of the present disclosure, the hand-shake correction layer (30a) may be arranged at the outmost area of the actuator and the auto focusing layer (30b) may be arranged at an area near to the housing (20). At this time, the hand-shake correction layer (30a) may be arranged with the second terminal units (31), and the auto focusing layer (30b) may be arranged with third terminal units (32) for controlling the auto focusing operation.

The lens mounted on the hand-shake correction layer (30a) can perform the hand-shake correction function through shift and tilting operations relative to the optical axis, and the lens mounted on the auto focusing layer (30b) can perform the auto focusing function through lifting operation relative to the optical axis.

Meanwhile, the second and third terminal units (31, 32) are preferably provided in plural numbers. Thus, four or more second terminal units (31) are preferably provided for OIS control, and two or more third terminal units (32) are preferably provided for auto focusing control. However, the number of second and third terminal units (31, 32) are not limited thereto and may be increased or decreased in response to increase and decrease of driving units for control, if necessary.

Meanwhile, according to the third exemplary embodiment of the present disclosure as illustrated in FIG. 5, it is also possible to reverse the configuration of the arrangement of the hand-shake correction layer (30a) and the auto focusing layer (30b) from that of the second exemplary embodiment of the present disclosure. In this case, other structural configurations than those of the hand-shake correction layer (30a) and the according to the third exemplary embodiment of the present disclosure as illustrated in FIG. 5, it is also possible to layer (30b) are same as those in the second exemplary embodiment.

Furthermore, according to the fourth exemplary embodiment of the present disclosure as illustrated in FIG. 6, it is also possible to design a configuration in which the actuator (30) is simultaneously equipped with the auto focusing and OIS functions. In this case, a single silicon base is etched to form an auto focusing unit lifting relative to the optical axis, and the auto focusing unit is formed to shift and tilt relative to the optical axis, whereby a single actuator (30) can be integrally formed with the second and third terminal units (31, 32).

In a case the actuator (30) is configured in the above manner, one sheet of lens can be controllably lifted, shifted and tilted relative to an optical axis to enable miniaturization of a camera module and simplification of assembly process.

Meanwhile, a shield can (40) may be formed at an outside surface of the housing (20). The shield can (40) is formed with a steel (SUS) material to block input of electromagnetic wave to the camera module and/or output of the electromagnetic wave from the camera module. Furthermore, the shield can (40) is preferably formed with a through hole at an area corresponding to that of the image sensor and the lens. However, the shield can (40) may be omitted, and if necessary, the shield can may be replaced by methods such as formation of a shield coating against the electromagnetic wave at the outside of the housing (20), for example.

Industrial Applicability

As apparent from the foregoing, the camera module according to the exemplary embodiments of the present disclosure has an industrial applicability in that the actuator (30) can be directly and conductively connected to the electronic circuit pattern layer (23) integrally formed on the surface of the housing (20) without assistance of a separate connection member, to reduce the number of parts and to minimize generation of defects in the assembly process.

Another industrial applicability is that, through improved structure of the actuator (30), even if at least one of the hand-shake correction function and the auto focusing function is embodied, terminal units (31, 32) for realizing these functions can be connected to the PCB (10) via connection with the electronic circuit pattern layer (23) formed on the surface of the housing (20), whereby expansion of functions can be beneficially realized.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

The invention claimed is:

1. A camera module with actuator mounting structure, the camera module comprising:
   a Printed Circuit Board (PCB) mounted with an image sensor;
   a housing coupled on the PCB to protect the image sensor;
   an actuator arranged on the housing, performing a hand-shake correction function and an auto focusing function; and
   an electronic circuit pattern layer, conductively connecting the actuator to the PCB;
   wherein the actuator includes an auto focusing layer driving a first lens and an Optical Image Stabilization (OIS) layer driving a second lens, and wherein the auto focusing layer and the OIS layer are stacked to form the actuator;
   wherein the electronic circuit pattern layer is integrally formed on at least one of an inner surface, an outer surface, or a cross section of the housing;

wherein the housing is formed with a wiring pattern where the electronic circuit pattern layer is formed; and wherein at least one terminal unit is formed on each of the PCB, the auto focusing layer, and the OIS layer, respectively, such that the PCB, the auto focusing layer, and the OIS layer are conductively connected to the electronic circuit pattern layer, respectively.

2. The camera module of claim 1, wherein the auto focusing layer is arranged at a position proximate to the housing, and the OIS layer is stacked on the auto focusing layer.

3. The camera module of claim 1, wherein the OIS layer is arranged at a position proximate to the housing, and the auto focusing layer is stacked on the OIS layer.

4. The camera module of claim 2 or 3, wherein the OIS layer and the auto focusing layer each is formed with an individual module for performing the hand-shake correction function or the auto focusing function, respectively.

5. The camera module of claim 2 or 3, wherein the OIS layer and the auto focusing layer are integrally formed in one body.

6. The camera module of claim 2 or 3, wherein the PCB is formed with a first terminal unit, the OIS layer is formed with a second terminal unit and the auto focusing layer is formed with a third terminal unit, wherein the first, second and third terminal units are connected to the electronic circuit pattern layer.

7. The camera module of claim 1, wherein the housing includes a holder having a predetermined height to accommodate the image sensor therein for protecting the image sensor.

8. The camera module of claim 7, wherein the PCB and the electronic circuit pattern layer are conductively connected to a connection unit formed with at least one of soldering and Ag dot bond.

9. The camera module of claim 1, wherein the electronic circuit pattern layer is formed on one of inner surfaces or one of outer surfaces of the housing, or on both the one of inner surfaces and the one of outer surfaces of the housing.

10. The camera module of claim 1, wherein the electronic circuit pattern layer is formed to have the wiring pattern on a surface of the housing using any one of over-molding, surface patterning, and etching work.

11. The camera module of claim 1, further comprising a shield can coupled to an outer surface of the housing.

12. the camera module of claim 1, wherein the housing is formed with a shield coating on an outer surface of the housing.

13. The camera module of claim 1, further comprising a barrel in a cylindrical shape and mounted with at least one lens.

14. The camera module of claim 7, wherein the PCB and the electronic circuit pattern layer are conductively connected by an ultrasonic fusion and conductive resin or by gold beads.

15. The camera module of claim 7, wherein the holder is formed in a square shape.

16. The camera module of claim 15, wherein the housing is integrally formed with the holder.

* * * * *